(12) United States Patent
Bischke et al.

(10) Patent No.: US 6,224,053 B1
(45) Date of Patent: May 1, 2001

(54) METHOD AND DEVICE FOR VERIFYING THE CORRECT TRANSPORT OF SHEET MATERIAL EMPLOYING A MECHANICAL TOUCH SENSOR

(75) Inventors: Norbert Bischke, Paderborn; Ulrich Nottelmann, Bad Driburg, both of (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/380,803

(22) PCT Filed: Feb. 23, 1998

(86) PCT No.: PCT/DE98/00534

§ 371 Date: Sep. 7, 1999

§ 102(e) Date: Sep. 7, 1999

(87) PCT Pub. No.: WO98/40849

PCT Pub. Date: Sep. 17, 1998

(30) Foreign Application Priority Data

Mar. 7, 1997 (DE) .............................................. 197 09 458

(51) Int. Cl.[7] ..................................................... B65H 7/12
(52) U.S. Cl. .................... 271/265.03; 271/263; 324/229; 324/251
(58) Field of Search ..................................... 271/262, 263, 271/265.03; 324/229, 251, 117 H

(56) References Cited

U.S. PATENT DOCUMENTS

| 5,125,642 | * | 6/1992 | Onsinger et al. | 271/262 |
| 5,437,445 | * | 8/1995 | Chang et al. | 271/263 |
| 5,662,324 | * | 9/1997 | Cannaverde | 271/263 |

FOREIGN PATENT DOCUMENTS

| 33 00 320 A1 | 9/1983 | (DE) . |
| 37 05 304 C2 | 11/1989 | (DE) . |
| 38 16943 | 11/1989 | (DE) . |
| 93 10 528 U | 11/1993 | (DE) . |
| 0 405 466 | 1/1991 | (EP) . |
| 0 596 606 A1 | 5/1994 | (EP) . |
| WO 86/00160 | 1/1986 | (WO) . |

* cited by examiner

*Primary Examiner*—H. Grant Skaggs
(74) *Attorney, Agent, or Firm*—Schiff Hardin & Waite

(57) ABSTRACT

A dispensing device employs a mechanical touch sensor. The mechanical touch sensor includes a touching level with a magnet that generates a magnetic field and a Hall generator that interacts with the magnetic field to generate an output corresponding to a thickness of the sheet material for verifying a correct transport of the sheet material.

11 Claims, 6 Drawing Sheets

METHOD AND DEVICE FOR VERIFYING THE CORRECT TRANSPORT OF SHEET MATERIAL EMPLOYING A MECHANICAL TOUCH SENSOR

BACKGROUND OF THE INVENTION

1. Field of the Invention

The invention relates to a method for verifying the correct transport of steel material, for example banknotes, particularly in an automatic cash dispenser. Furthermore, the invention relates to a device for carrying out the method.

2. Description of the Prior Art

In the case of a known automatic cash dispenser, banknotes are dispensed individually one after the other from the banknote cartridges until the amount desired by the customer is reached. During this dispensing, it is possible for a number of banknotes to be transported lying one on top of the other, which would lead to incorrect dispensing. The automatic cash dispenser therefore contains devices which detect the multiple transport of banknotes and segregate the incorrect banknotes or the bundle of banknotes.

Patent Document No. 38 16 943 discloses a method of testing sheet material by sensing the sheet material with radiation along a predetermined sensing path. The sensing takes place under the transillumination principle. On the transmission side, light-emitting diodes are subjected to a current from a controllable current source, and on the receiver side photodiodes determine the light passing through the sheet material. If a number of sheets lie one on top of the other, the signal of the photodiode drops below a predetermined limit value, and incorrect transport fo the sheet material is signaled. The set current is made up of a basic current value and a differential current value. The differential current value is determined on the basis of sample sheets in a calibrating operation. The basic current value is set such that on the receiver side the signal level lies within a predetermined measuring range.

The principle described in German Patent Document No. 38 16 943 therefor, in which current control is used and the signal level of the detector is monitored within predetermined limits, has proven successful in practice. If, however, sheet material with greatly varying transillumination properties is used, for example American dollar bills, the reliability of the determination of multiple transport of sheet material may be restricted.

German Patent Document No. 93 10 528 therefor; discloses a paper-thickness measuring device which contains a mechanical sensor. The sensor contains a sensor coil through which current flows and the impedance of which changes when an element enters its magnetic field. The depth of entry depends on the thickness of the paper. Furthermore, German Patent Document No. 33 00 320 therefor; and German Patent Document No. 37 05 304 therefor describe the use of inductive displacement pickups for measuring the thickness of paper sheets.

European Application 0 405 466 therefor; discloses a method and a device according to the preambles of claims 1 and 8. According to this document, a Hall generator is arranged lying opposite a fixedly arranged permanent magnet, so that an air gap is formed. A magnetically conducting end of a touching lever engages in this air gap and changes the magnetic field in a manner dependent on the deflection of the touching lever. This change in the magnetic field is determined by the Hall generator, the signal of which is evaluated for determining correct transport of sheet material.

WO-A-86/00160 discloses a thickness-measuring device for banknotes. Situated opposite a Hall generator is a permanent magnet. A that is fed into the device banknote increases the distance between the permanent magnet and the Hall generator, so that a magnetic field change is produced, whereupon the resistance of the Hall generator changes. The setting of a control current for the Hall generator dependent on the type of banknote and the interaction with the sensitivity of the arrangement of the permanent magnet and Hall generator are not described in this document.

SUMMARY OF THE INVENTION

It is the object of the invention to specify a method and a device which monitors the correct transport of sheet material with high operational dependability is of a simple construction and can be used flexibly for different types of sheet material.

This object is achieved for a method by the features of claim 1. Advantageous developments are specified in the dependent claims.

The method according to the invention uses a mechanical sensor which determines the thickness of the transported sheet material. In the event of double transport of the sheet material, double the thickness is therefore detected and the incorrect transport of sheet material can easily be established. For the thickness measurement, a magnetic sensor is used, which establishes the change in the magnetic field at a measuring location. The operating point of such a magnetic sensor can be set by a control current, i.e. the principle disclosed and successfully proven by German Offenlegungsschrift 38 16 943 therefor; of an operating-point setting by current setting can be retained. As a difference in comparison with the subject matter according to the aforementioned document, however, in the case of the invention the control current is se ton the sensor side, wherein the electronic requirements are all on the sensor side and the associated hardware can easily be set up. This control current is set such that the sensor voltage without transport of a sheet lies within a predetermined evaluation voltage range. If the transmission properties of the sensor change, this is compensated by correcting the control current. Mechanical tolerances in production, temperature influences or mechanical wear can be compensated by correcting the control current.

According to the invention, a Hall generator in the form of a semiconductor element is used as the magnetic sensor. In the case of such a Hall generator, the sensor voltage is evaluated transversely to the current flow of the control current. By setting the control current, this sensor voltage can be influenced. The Hall generator is therefore a virtually ideal component for applying the principle realized in the case of the invention of setting the control current and evaluating the sensor voltage within a predetermined evaluation voltage range.

The invention is also characterized in that the mechanical sensor comprises at least one touching lever, which bears on a surfact of the sheet material and is swiveled about an angle corresponding to the thickness of the sheet material. The touching lever bears a permanent magnet, the magnetic field of which passes thorough the active surface of the Hall generator, the magnetic field changing in a manner dependent on the deflection of the touching lever. Such a sensing system in conjunction with a magnetic field change at the measuring location is of a simple construction and can be integrated in a simple way into the transporting path of the sheet material.

According to a further aspect of the invention, a device for verifying the correct transport of sheet material is specified. This device is particularly suitable for carrying out the method according to the invention. The advantageous effects which can be achieved with the device essentially coincide with those which have already been mentioned in the explanation of the method.

DESCRIPTION OF THE PREFERRED EMBODIMENTS

Figure 1:
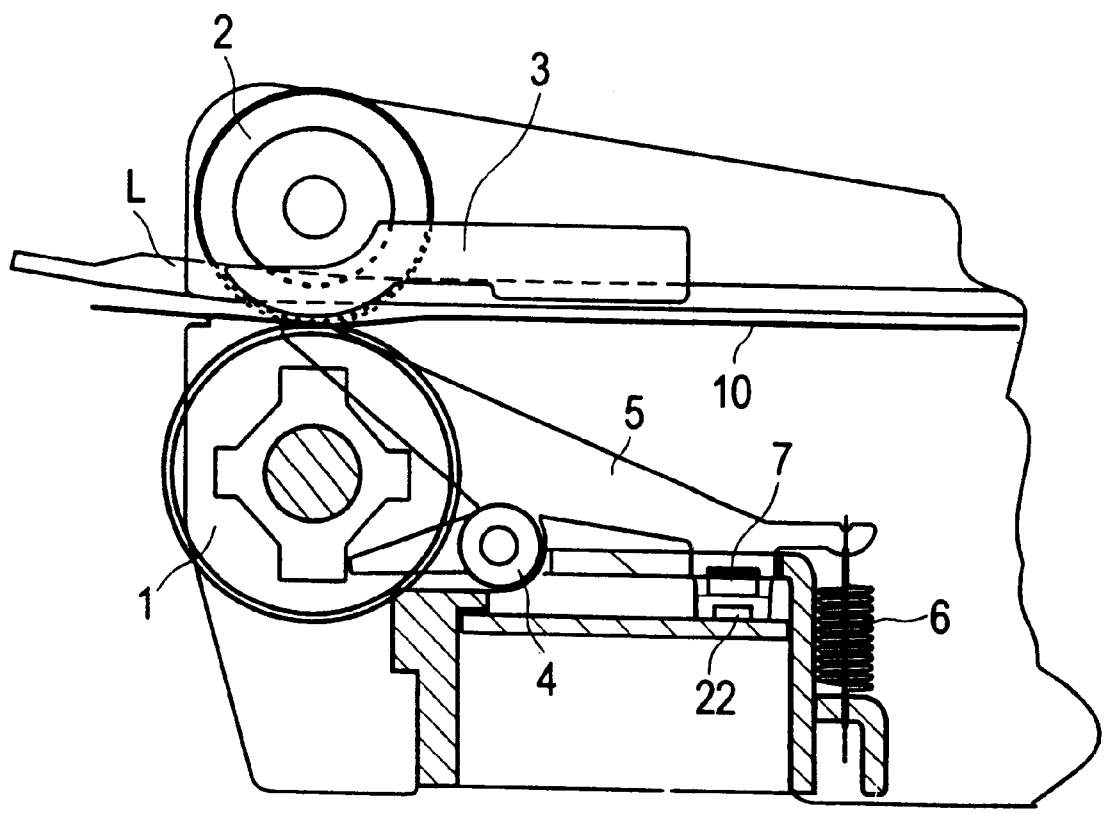
FIG. 1 shows in a side view the construction of a feeding device with a mechanical sensor, which is switched into the transporting path for banknotes.

FIG. 1 shows in a cross section a feeding device with a mechanical sensor for determining the thickness of the sheet material. A lower drive roller 1, driven by a motor (not represented), is coupled to an upper drive roller or counter pressure roller 2 by means fo a gear mechanism (represented in FIG. 2). In the transporting gap between the two drive rollers 1, 2, a banknote 10 is guided along a baffle plate L. The banknote 10 bears with its upper surface against a counterbearing 3. Two touching levers 5 (only one touching levers 5 can be seen in FIG. 1), which can be swiveled about a respective pivot bearing 4, sense the lower surface of the banknote 10 with a front end. If no banknote 10 is being guided in the transporting gap, this end bears against the surface of the counterbearing 3. The other end of the touching levers 5 is respectively fixed by a spring 6. The spring 6 biases the touching lever 5 in the direction of the counterbearing 3. Respectively arranged on the underside of the touching levers 5 is a permanent magnet 7, the magnetic field of which passes through the active surface of the Hall generator 22 assigned to it. A further Hall generator 24 is assigned to the other touching lever.

Figure 2:
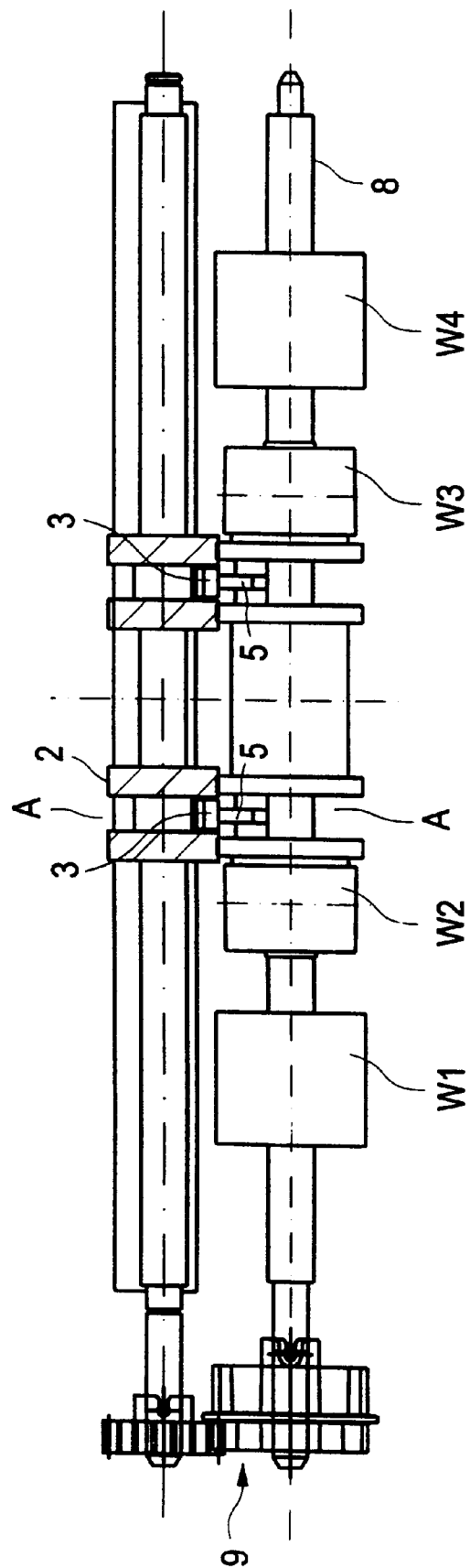
FIG. 2 shows a front view of the construction with a sensor according to FIG. 1.

In FIG. 2, a front view of the feeding device with a mechanical sensor according to FIG. 1 is represented. The lower drive roller 1 and upper drive roller 2, connected by a gear mechanism 9, have clearances A, in which the front ends of the touching levers 5 and the end portions of the counterbearings 3 are respectively guided. Provided on the lower shaft 8 are further rollers W1, W2, W3, W4, to which counterrollers of the same type as the upper drive rollers are assigned. For reasons of overall clarity, these counterrollers have been omitted in FIG. 2. In the case of an exemplary embodiment, the upper and lower drive rollers 1, 2 may be arranged in an axially desplaceable manner, in order to vary the distance between the paths sensed by the touching levers 5 and adapt it to the dimensions of the banknotes.

Figure 3:
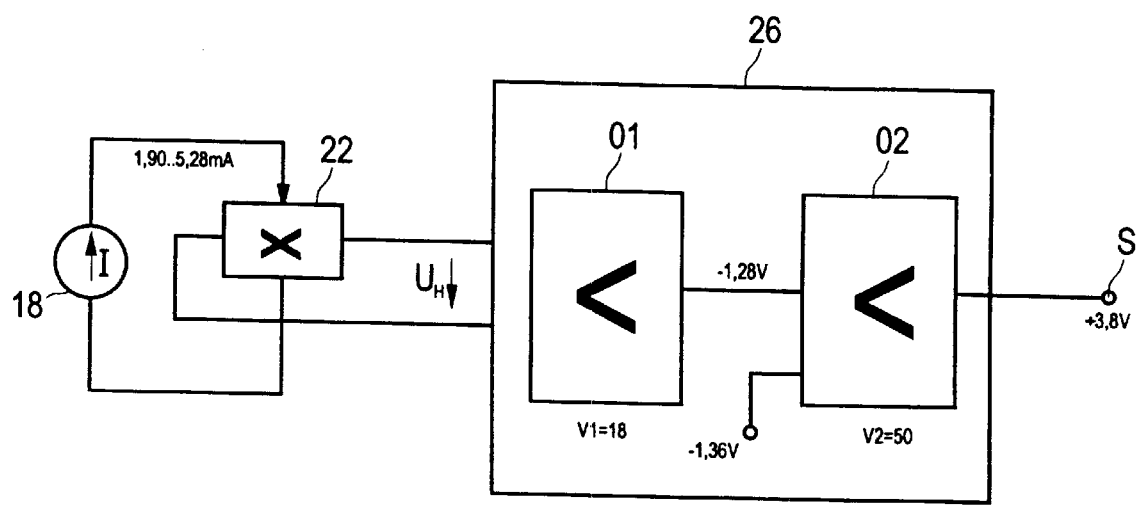
FIG. 3 shows a Hall generator with an amplifier unit.

FIG. 3 shows the Hall generator 22, the Hall voltage $U_H$ of which is prepared and amplified by an amplifier device 26. The Hall generator 22 has a leaf-like construction and contains a semiconductor III–V compound, for example indium antimonide $IN_5SB_3$. when such a material is used, the current flow of relatively fast-moving electrons is determined, wherein a relatively great Hall voltage $U_H$ is obtained by applying a transversal magnetic field. The Hall generator 22 is flowed through in the longitudinal direction by a control current I. For generating this control current I, a controllable current source 18 is used. The control current I lies in the range from 1.9 to 5.28 mA. In practice, a Hall voltage $U_H$ of about 70 mV is obtained. The Hall voltage $U_H$ is amplified in the amplifier device 26 by an operational amplifier O1, designed as a subtractor, wherein a typical voltage of $-1.28$ V is obtained. The following operational amplifier O2 likewise operates as a subtractor and generates the output signal S. The gains V1 and V2 of the operational amplifiers O1 and O2 are around 18 and 50 respectively. For the further Hall generator 24, and amplifier device 28, which has the same construction as the amplifier device 26, is used.

Figure 4:
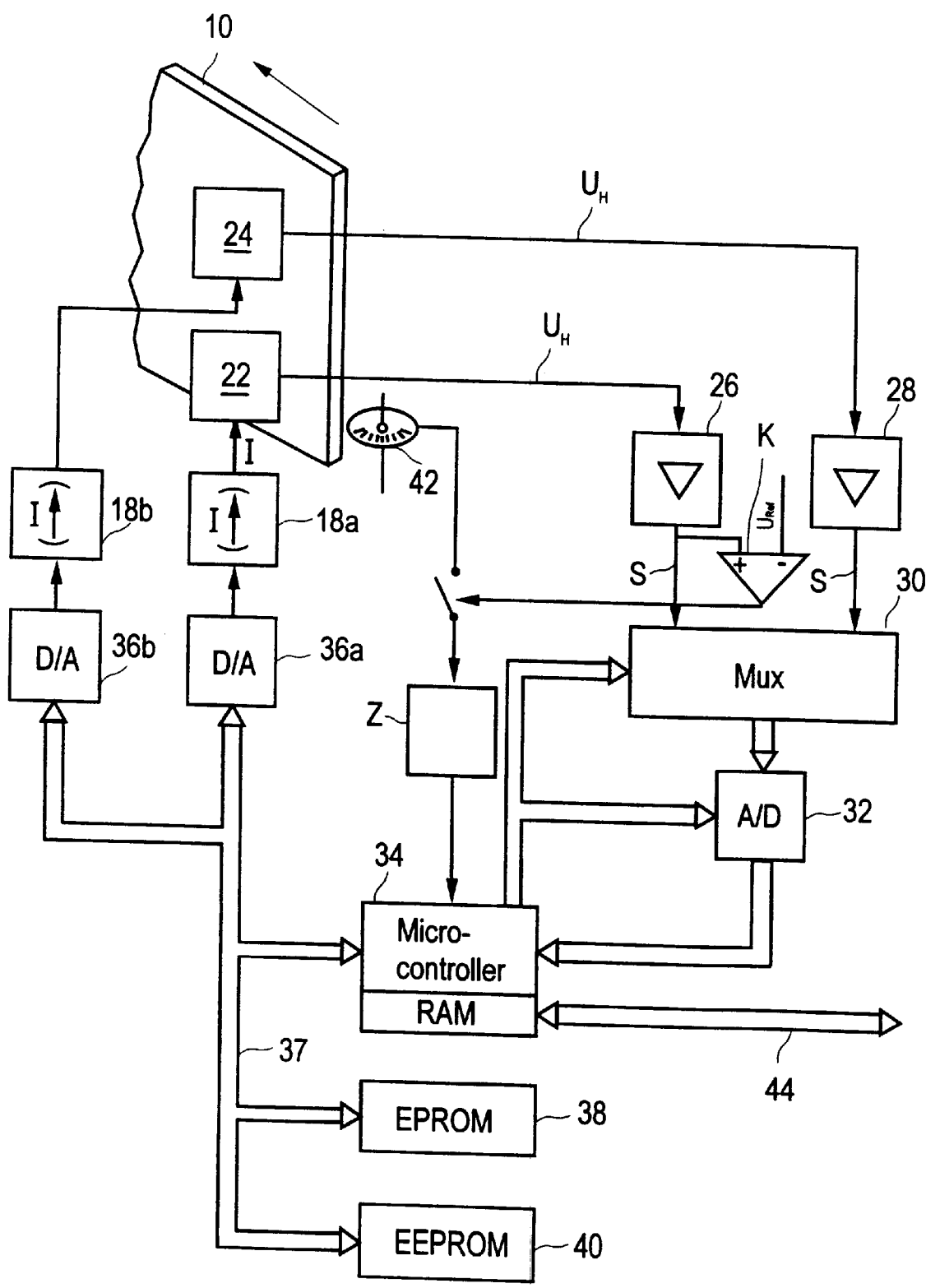
FIG. 4 shows a schematic representation of the functional units used for carrying out the method.

FIG. 4 schematically shows the various functional units which are used for carrying out the method. As mentioned, the banknote 10 to be tested for multiple transport is guided through the transporting gap between the lower drive roller 1 and the upper drive roller 2. For reasons of overall clarity, the mechanical sensor represented in FIGS. 1 and 2 has been omitted in FIG. 4. Depending on the thickness of the banknote 10 or a number of sheets lying one on top of the other, the touching levers 5 are deflected, the respective permanent magnet 7 moving away from the assigned Hall generator 22 or 24, respectively. The magnetic field passing through the Hall generator 22, 24 accordingly becomes weaker and the respective Hall voltage $U_H$ decreases.

The signal S generated by the identically constructed amplifier devices 26, 28 is fed to an analog multiplexer 30. The two signals S are alternately switched through in the analog multiplexer 30 to its output and fed to an analog/digital converter 32, the digital output of which is connected to the input of a microcontroller 34. The latter controls the analog multiplexer 30 and also starts the conversion cycle of the analog/digital converter 32. The output signal S of the amplifier 26 is fed to a comparator K. The output signal of the latter activates a counter A, which counts the clock signals of a displacement sensor 42.

The microcontroller 34 has access to a memory RAM for storing current data, for example the signals S, and is connected via a data bus 37 to an EPSOM 38, which serves as a program memory for the microcontroller 34, as well as to an EEPROM 40, which is used for storing banknote-specific data. Alternatively, a battery-buffered CMOS-RAM device may be used, wherein the values determined during calibration with sample banknotes are permanently stored.

The microcontroller 34 controls the sequence of the overall method, calculates mean values from the signals S and compares them with predetermined values, as still to be described. The microcontroller 34 also controls two digital/analog converters 36a, 36b, the output signals of which serve for the respective setting of the current I of the controllable current sources 18a, 18b. The generated currents I pass through the Hall generators 22 and 24, respectively. Furthermore, the microcontroller 34 is connected via a data line 44 to a higher-level computer (not represented in FIG. 4).

Figure 5:
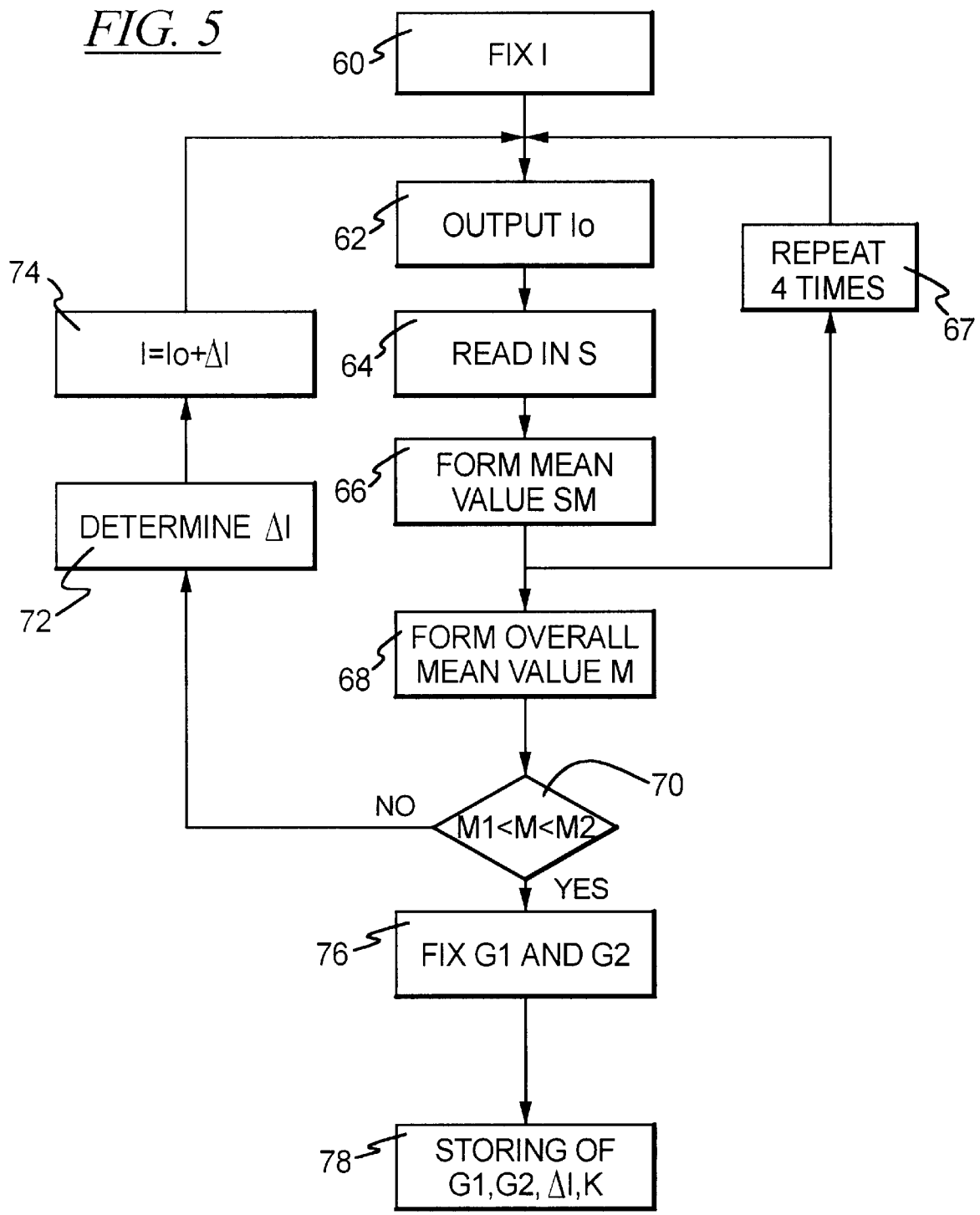
FIG. 5 shows a flow diagram of the calibrating operation used in the case of an exemplary embodiment of the method for determining sample values.

By calibrating with sample banknotes, the automatic cash dispenser can be set to a type of banknote desired by the user. The calibrating operation is shown a flow diagram in FIG. 5. In a first method step 60, a defined initial state for the signals S is set. For this purpose, the sensing/measuring path is operated without feeding a banknote, so that the distance between the magnets 7 and the Hall generators 22, 24 is minimal. The Hall generators 22, 24 are brought into an operating state by means of the controllable current sources 18a, 18b with a basic current value $I_O$ (method step 62) such that the level of the signals S of the Hall generators 22, 24 lies in the upper portion of a predetermined operating range of the analog/digital converter 32, for example at 90% of the overall operating range and above the switching threshold of the comparator K. The basic current values $I_O$ for the two Hall generators 22, 24 may be different.

In the next method step 64, a sample banknote is transported forward by the transported device and sensed along the sensing path determined by the position of the touching levers 5. The signals S of the Hall generators 22, 24 are read into the memory RAM of the microcontroller 34 in a time-division multiplexing method and, either during the reading in or after the banknote 10 has run through the sensing path, the arithmetic mean value SM of the two signals S is formed (method step 66). To obtain a higher statistical certainty of the result during calibration, the testing operation is carried out in a way corresponding to the branch 67 shown in FIG 5, with for example four banknotes which differ with regard to their used condition. From the four mean values SM thus obtianed, in the method step 68 an arithmetic overall mean value M is calculated, also referred to as setpoint value M. This setpoint value M is checked in the next method step 70 to ascertain whether it lies in a predetermined range, formed by a lower value M1 and an upper value M2. The values M1, M2 are stored as fixed digital values in the microcontroller 34, If the setpoint value M lies outside this range, for example if especially thick banknotes are used, a predetermined differential current is added to the basic current value $I_O$ in the branch 72, 74 shown in FIG. 5, in order that there is a high probability that during the next calibrating operation the setpoint value M will lie within the range defined by the values M1, M2. In this way, an adaptation of the measuring range takes place. The current I to which the Hall generators 22, 24 are subjected after running through the method steps 72, 74 is then obtained form the sum of the basic current value $I_O$ and the differential current value $\Delta I$.

The setpoint value M thus obtained and, if appropriate, the differential current value $\Delta I$ identify the sample banknotes. With the aid of the setpoint value M, a tolerance range within which the mean value SM of a banknote to be tested must lie in order to be detected as belonging to this type of banknotes and as a single banknote is defined in the method step 76 by a lower limit value G1 and an upper limit value G2. The data belonging to a particular type of banknotes, for example the upper limit value G2, the lower limit value G1, in the case of thick banknotes the differential current value $\Delta I$, and an identification K of the banknotes, are stored in the method step 78 in the EEPROM 40 and are retrieved during the testing of the banknotes.

Figure 6:
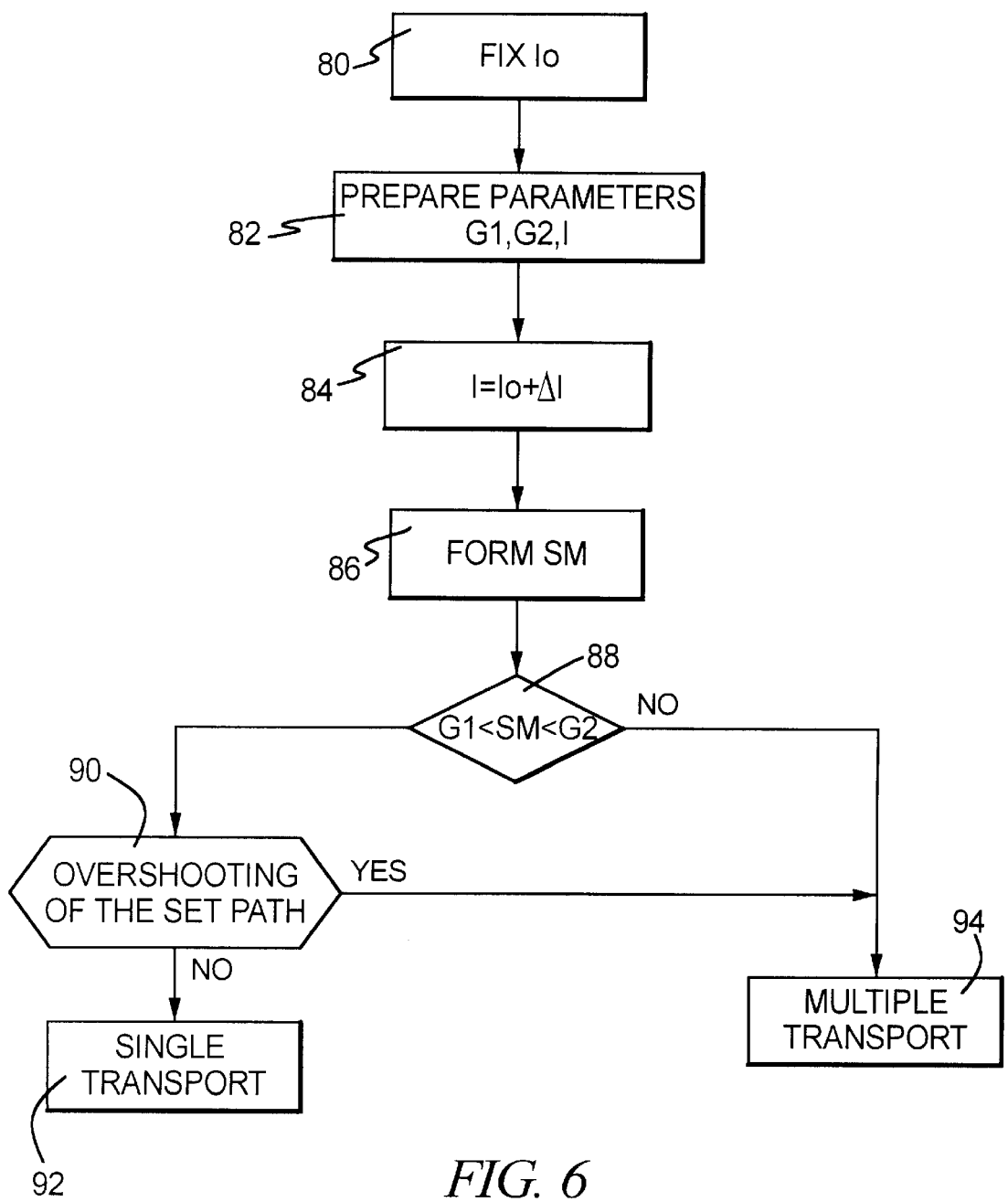
FIG. 6 shows a flow diagram for detecting the multiple transport of sheet material.

In FIG. 6, the sequence of a testing operation for establishing multiple transport of banknotes is represented on the basis of a flow diagram. Before a banknote to be tested is transported into the sensing/measuring path, the basic current value $I_O$ is determined, in the way already described, in the calibrating operation (method step 80). For carrying out the test, in the next method step 82 the microcontroller 34 accesses the banknote-specific parameters, comprising the upper limited value G2, the lower limit value G1 and, if appropriate, the differential current value $\Delta I$, which are stored in the EEPROM 40. The microcontroller 34 causes the current I to be fed to the Hall generators 22, 24 by means of the digital/analog converter 36 and the controllable current sources 18a, 18b (method step 84). the banknote 10, fed to the sensing/measuring path by means of a transporting device, is sensed along the defined sensing paths and a sequence of sensing signals S is generated by means of the Hall generators 22, 24. The digital values of the signals s are read into the memory RAM of the microcontroller 34 and, in the following method step 86, the arithmetic mean value SM is calculated. The mean value SM is subsequently compared with the stored limit values G1, G2 (method step 88).

If the mean value SM lies within the tolerance range defined by the limit values G1, G2,

What is claimed is:

1. A method for verifying a correct transport of sheet material employing a mechanical touch sensor comprising the steps of:

providing a dispensing device employing a mechanical touch sensor for transporting said sheet material, said mechanical touch sensor includes a touching lever and a Hall generator, each positioned at a measuring location along a measuring path of said dispensing device, said touching lever includes a permanent magnet that generates a magnetic field, said Hall generator includes a semiconductor component having an active surface through which a control current flows;

setting said control current for generating a control signal having a predetermined tolerance range value, said predetermined tolerance range value is determined for a single correct sheet of said sheet material;

transporting said sheet material having a thickness along said measuring path;

detecting said thickness at said measuring location by passing said magnetic field through said sheet material and into said active surface, said magnetic field varies with said thickness;

generating said detection signal, said detection signal varies with said magnetic field;

comparing said detection signal to said control signal for determining said correct transport of said sheet material.

2. A method according to claim 1 wherein said dispensing device is an automatic cash dispenser.

3. A method according to claim 1 wherein said dispensing device further comprises a drive roller and a counter-pressure roller for guiding said sheet material during said transporting step, said transporting step further comprises contacting said sheet material with said touching levers by swiveling said touching lever about an angle corresponding to said thickness.

4. A method according to claim 1 further comprising the step of determining a mean value of said detection signal for comparison to said predetermined tolerance range value having an upper and lower limit value.

5. A method according to claim 1 wherein said measuring path is covered by said sheet material during said detecting step.

6. A method according to claim 1 further comprising a step of calibrating said mechanical touch sensor by employing a plurality of calibration samples for generating said control signal having an overall mean value within said predetermined tolerance range value.

7. A method according to claim 1 wherein said control current comprises a basic current and a differential current, said basic current has a value corresponding to a signal having a predetermined tolerance range value, said signal is generated without detection fo said sheet material, said differential current has a value corresponding to said sheet material.

8. A method according to claim 1 wherein said basic current is measured at predetermined time intervals.

9. A device employing a mechanical touch sensor for verifying a correct transport of sheet material comprising:

a dispensing device having a measuring path of transporting said sheet material having a thickness along said measuring path having a measuring location;

a mechanical touch sensor being disposed in said dispensing device, said mechanical touch sensor comprising a touching levers and a Hall generator interacting with said touching lever for measuring said thickness at said measuring location;

said touching lever comprising a magnet that passes a magnetic filed through an active surface of the Hall generator for detecting said thickness, said magnetic field varies with said thickness;

said Hall generator comprising a semiconductor component through which a control current flows for generating a control signal, said control signal having a predetermined tolerance range value, said Hall generator generates a detection signal during detection of said thickness, said detection signal varies with said magnetic field and is compared to said control signal for verifying said correct transport of said sheet material.

10. A device according to claim 1 wherein said dispensing device further comprises a drive roller and a counter-pressure roller for guiding said sheet material during transport, said touching lever contacts said sheet material by swiveling about an angle corresponding to said thickness.

11. A device according to claim 10, wherein said dispensing device is utilized within an automatic cash dispensing device.

* * * * *